United States Patent [19]

Bodge

[11] 3,781,839

[45] Dec. 25, 1973

[54] FLUID FLOW SENSING DEVICE
[75] Inventor: Clifford A. Bodge, Attleboro, Mass.
[73] Assignee: Texas Instruments Incorporated, Dallas, Tex.
[22] Filed: Jan. 7, 1972
[21] Appl. No.: 216,299

Related U.S. Application Data
[63] Continuation of Ser. No. 811,869, April 1, 1969, abandoned.

[52] U.S. Cl............ 340/239 R, 73/204, 340/244 R
[51] Int. Cl. .......................................... G08b 21/00
[58] Field of Search ............ 340/239 R, 244, 228 R; 323/68, 69; 317/148.5 B, DIG. 1, DIG. 3, 132; 73/204, 295; 307/118, 310, 318

[56] References Cited
UNITED STATES PATENTS

| 2,769,121 | 10/1956 | Rogoff | 317/132 |
| 3,032,690 | 5/1962 | Elliot | 317/41 |
| 3,184,689 | 5/1965 | Wylde | 331/117 |
| 3,307,167 | 2/1967 | Race | 340/253 |
| 3,407,840 | 10/1968 | Finnegan | 137/392 |
| 3,432,840 | 3/1969 | Neapolitakis et al. | 340/244 R |
| 3,498,131 | 3/1970 | Rickey | 340/244 C |

FOREIGN PATENTS OR APPLICATIONS
1,178,616   9/1964   Germany

Primary Examiner—John W. Caldwell
Assistant Examiner—Daniel Myer
Attorney—Harold Levine

[57] ABSTRACT

The disclosed device includes a thermistor sensor particularly adapted for disposition in thermal communication with a fluid medium utilized for effecting cooling of equipment. The thermistor sensor senses variations in the heat transfer characteristics of the medium, and is coupled to a power supply through a resistor, which cooperates with the thermistor sensor to define a voltage divider, including a junction. A voltage responsive means is coupled to the junction and is rendered operable in response to the establishment of an increased voltage level at the junction, when the heat transfer properties of the medium decreases. The voltage responsive means provides an electrical signal for energizing a switch means so as to render a load circuit inoperable in response to a decrease in the heat exchange properties of the fluid medium. Alternatively, the electrical signal may be utilized for operating an indicator to provide an indication of a decrease in the heat exchange properties of the fluid medium.

10 Claims, 8 Drawing Figures

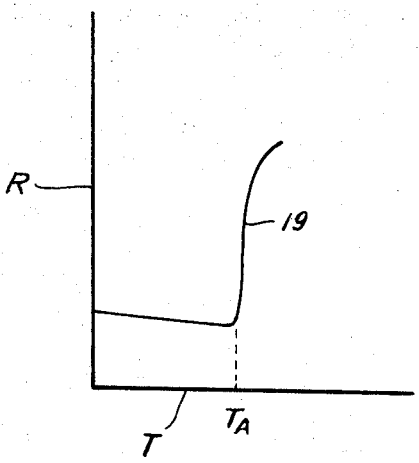
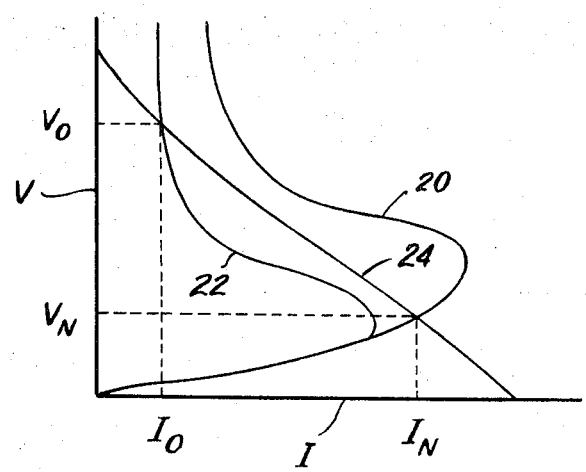
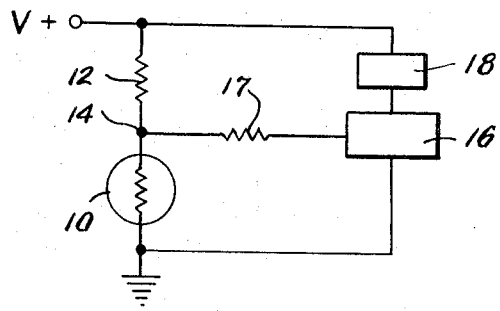
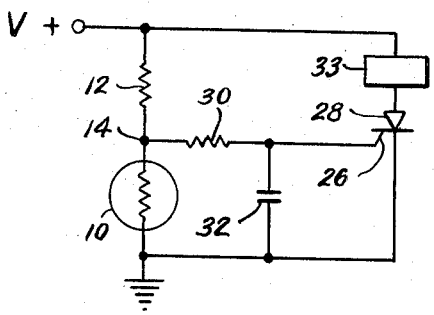
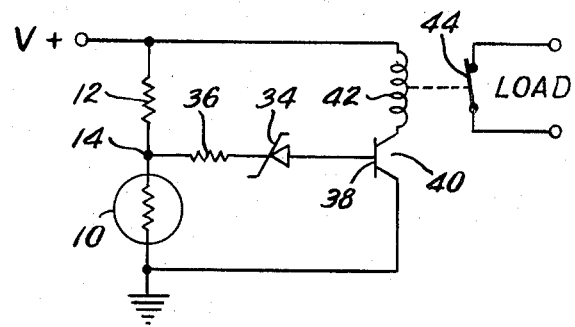

PATENTED DEC 25 1973

INVENTOR,
Clifford A. Bodge,
BY
Donald B. Epstein
Att'y.

FLUID FLOW SENSING DEVICE

This is a continuation, of application Ser. No. 811,869, filed Apr. 1, 1969, and now abandoned.

The present invention relates generally to a device for sensing variations in the heat exchange properties of a medium and more particularly is directed to a device for sensing variations in the heat exchange properties of a fluid medium as an indication of the relative flow rate of the medium.

It has become increasingly important in recent years to provide fluid cooling systems for use in conjunction with heat sensitive equipment. Such cooling systems are especially desirable in conjunction with equipment employing various types of electrical circuit elements, particularly semiconductor devices, which are generally relatively immune to mechanical shock, but may be highly sensitive to increases in ambient temperature. In addition, the use of equipment including relatively large numbers of such circuit elements or other heat sensitive components provided in an enclosed space, such as in computers, for example has become increasingly prevalent.

It has been found that in many instances appropriate cooling may be effected by merely establishing a suitable air flow and utilizing the heat transfer characteristics of this environmental air in order to effect appropriate cooling of the circuit elements. Alternatively, in other instances it may be desirable to dispose the equipment in communication with another gaseous medium or in an appropriate liquid medium. In any event the medium may be arranged to have the desired heat transfer characteristics by the provision of means for maintaining the temperature of the medium at a desired level or by selecting a medium, which has the desired heat transfer characteristics, when a preselected flow rate or velocity is established relative to the equipment being cooled.

However, in order to provide assurance of the continued exposure of the equipment to the cooled or flowing medium it is desirable to provide a device for sensing the presence of an appropriate flow velocity or medium temperature. It may be readily appreciated that if such a cooling system should fail, even for a relatively short time interval, potentially destructive heating effects may result, causing irreparable damage to various of the heat sensitive components of the equipment. Consequently, the necessity for the provision of a device becomes readily apparent, for continually monitoring the temperature, presence, or flow rate of the medium and providing an appropriate indication of the failure of the cooling system, or, alternatively, effecting automatic shut-down of the equipment being cooled.

Although various types of electro-mechanical devices have been developed for sensing the cooling effects of fluid flow such sensors are often inadequate for various reasons. For example, such sensors may have poor response characteristics, and may be unable to sense relatively small changes in fluid flow. In addition, such sensors, particularly when relatively large in size are susceptible to nuisance tripping as a result of temporary surges in fluid flow, equipment vibration, equipment orientation, gravity, and mechanical stress or vibration. Furthermore, the provision of electro-mechanical sensors presents a reliability problem due to eventual wear of mechanical parts.

Accordingly, it is an object of the present invention to provide an improved device for sensing the heat transfer characteristics of a fluid medium.

It is another object of the present invention to provide an improved protective device for sensing variations in the flow velocity of a fluid medium as an indication of the heat transfer characteristics of the medium.

It is another object of the present invention to provide a substantially fail-safe protective device for use with equipment to be arranged in communication with a cooling fluid medium for sensing variations in the heat exchange properties of the medium as an indication of variations in the relative velocity of the medium.

It is still another object of the present invention to provide a protective device adapted for sensing variations in the heat transfer characteristics of a fluid coolant to permit relatively rapid disruption of the power supplied to the equipment being cooled.

It is a further object of the present invention to provide a protective device adapted for sensing variations in the heat transfer characteristics of a fluid coolant and for effecting energization of an indicator in response to a decrease in the heat transfer characteristics of the fluid.

It is still a further object of the present invention to provide a protective thermal sensing device adapted for sensing variations in the heat transfer characteristics of a fluid coolant as an indication of variations in the flow rate of the fluid which protective thermal sensing device is extremely flexible and versatile in operation and durable in use.

Various additional objects and advantages will become readily apparent from the following detailed description and accompanying drawings wherein:

FIG. 1 is a graphical representation of a typical resistance temperature curve for a positive temperature co-efficient thermistor;

FIG. 2 is a graphical representation of typical voltage-current response curves of a positive temperature co-efficient thermistor sensor subjected to several different heat transfer conditions and also illustrating a superimposed series resistance load line; and FIGS. 3–8 are schematic circuit diagrams of various embodiments of a device in accordance with the principles of the present invention.

Corresponding elements are provided with corresponding reference numerals in the drawings.

Figure 6:
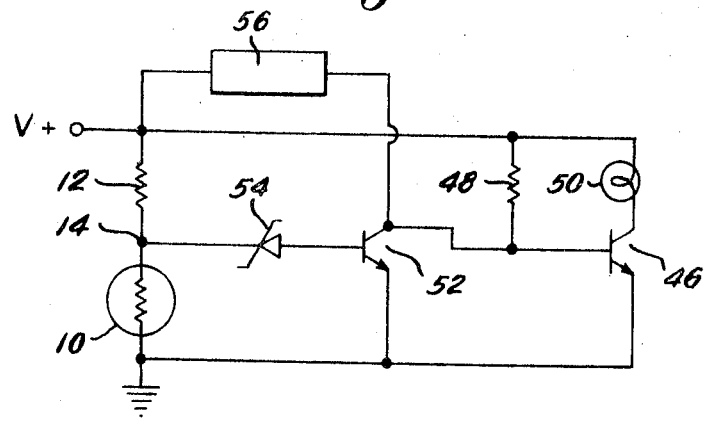

Referring generally to the drawings, a schematic circuit diagram of one embodiment of a device in accordance with the principles of the present invention is illustrated in FIG. 3. As shown, a thermistor sensor 10 is provided which is adapted to be disposed in thermal communication with a suitable fluid medium. The fluid medium may comprise a gaseous medium, such as air, or it may comprise a desired liquid medium. Similarly, the thermistor sensor may be arranged to sense the flow rate of the fluid, the temperature of the fluid, the presence or absence of the fluid, etc., depending upon the contemplated application of the device. The thermistor sensor 10 is coupled to a suitable power supply (not shown) through a calibration means 12, preferably comprising a resistor connected in series relationship with the thermistor sensor. The thermistor sensor 10 and the series resistor 12 are arranged in a voltage divider configuration, which includes a junction 14 defined by the connection between the thermistor sensor and the resistor. The voltage divider junction 14 is coupled to a suitable voltage responsive means 16, preferably through a current limiting resistor 17. The voltage responsive means 16 is adapted to sense variations in the voltage level established at junction 14, as a result of variations in the resistance of thermistor 10, to provide an electrical signal in response to a preselected increase in this voltage level, as will be more fully explained hereinafter. In addition, a suitable power sensing means 18 is preferably connected to the voltage responsive means. The power sensing means 18 is adapted to be energized in response to energization of the voltage responsive means 16, and may be arranged to provide an appropriate indication, when the voltage responsive means is energized. Alternatively, the power sensing means 18 may comprise an appropriate switch such as a relay coil, which is coupled to the equipment being protected for selectively disrupting the power being supplied to the equipment in the absence of desired heat transfer conditions.

Referring briefly to the graphical representations in FIGS. 1 and 2, operation of a device in accordance with the present invention is explained in somewhat more detail. More particularly, FIG. 1 illustrates the resistance-temperature characteristic curve 19 of a typical positive temperature co-efficient thermistor sensor. As may be seen from an inspection of FIG. 1, the resistance of such a thermistor sensor remains relatively constant with increasing temperature until a temperature designated $T_A$ is reached. $T_A$ represents the anomaly temperature of the thermistor sensor, and designates the temperature at which the resistance of the thermistor sensor changes by several orders of magnitude with very small increases in temperature. This particular property of a positive temperature co-efficient thermistor sensor is advantageously utilized in the present invention.

For example, in operation of a device in accordance with the principles of the present invention a relatively small energizing voltage supplied to the thermistor sensor causes self-heating to be effected. However, as long as the thermistor sensor is exposed to a cooling medium, such as an air flow, it may be cooled sufficiently to cause its resistance to remain in the stable region below the anomaly point. Thus, it may be seen that a reduction in the heat transfer characteristics of a medium may be readily sensed by an appropriately arranged thermistor sensor.

In this regard, referring to FIG. 2, which depicts the voltage-current characteristics of a typical positive temperature co-efficient thermistor exposed to a fluid medium at several different heat transfer conditions with a superimposed series resistor load line, operation of a device in accordance with the principles of the present invention is further illustrated. More particularly, a curve 20 is shown illustrating the voltage-current characteristic of such a thermistor sensor disposed in a fluid medium, such as air having a desired flow velocity sufficient to cool the thermistor sensor, preventing it from reaching its anomaly temperature, and sufficient to maintain the equipment being cooled (not shown) within the requisite temperature limits. Similarly, the curve designated by the numeral 22 represents the voltage-current characteristic curve of the same thermistor sensor, but exposed to the fluid medium under conditions of a substantially decreased flow velocity which is insufficient for cooling the thermistor sensor to prevent self-heating and which could be insufficient for cooling the equipment. As illustrated, a significant shift in the relative position of the voltage-current characteristic curve results under conditions of decreased fluid velocity and associated decreased heat transfer.

As previously explained, a series resistor 12 is generally coupled to the thermistor sensor, and the load line of the resistor 12 is illustrated in FIG. 2 and designated by the numeral 24. In addition, it may be noted that the relative position of the resistance load line 24 is dependent upon the resistance of series resistor 12, and may be readily shifted in position in accordance with the circuit requirements by selecting a series resistor having a different value of resistance. As shown, the resistance load line 24 intersects the fluid velocity curve 20 at a particular operating point designated $I_N$, $V_N$, representing the operating point of the thermistor sensor 10 during usual operation of the circuit, when the thermistor sensor is exposed to a medium having a sufficient velocity flow rate, or heat transfer condition, necessary for effecting the requisite cooling of the equipment. If desired, the resistance load line 24 may be shifted in position to provide a different operating point, $I_N$, $V_N$, as previously explained. Furthermore, observation of FIG. 2 reveals that the resistance load line 24 also intersects the curve 22, which represents the voltage-current characteristic of the thermistor sensor at a decreased fluid velocity. Since a positive temperature co-efficient thermistor is utilized, the resistance of the thermistor increases, when it is exposed to an increased temperature or decreased heat transfer conditions, as the thermistor approaches and reaches its anomaly point. Thus, the voltage across the thermistor increases, while the current flow decreases. This effect is illustrated by the intersection of the resistance load line 24 with the curve 22. As shown, a substantially larger voltage and a substantially smaller current occur. The intersection of the resistance load line 24 with the curve 22 represents the operating point, $V_O$, $I_O$ of the thermistor sensor 10, when exposed to decreased heat transfer conditions. More particularly, $V_O$ represents the voltage appearing at the junction 14 under such conditions, while $I_O$ represents the current through the thermistor.

Thus, during operation of a device in accordance with the present invention the energizing voltage, which is supplied to the thermistor sensor 10 causes some self-heating of the thermistor sensor. However, as long as the thermistor sensor is disposed in a cooling medium, such as an adequate air flow, the sensor is sufficiently cooled to remain stable along its low resistance region. However, when the air flow velocity decreases to a certain level so that the equipment being cooled, for example, may be in danger of overheating, this decreased heat transfer condition disturbs the stability of the thermistor sensor and its temperature begins to increase. As the temperature of the thermistor sensor increases and approaches its anomaly point, its resistance abruptly increases by several orders of magnitude. This increase in resistance is accompanied by a rapid voltage rise at the junction 14 to which the thermistor is coupled, and is also accompanied by a rapid decrease in the current through the thermistor. As a result of this rapid voltage rise at the junction 14 and the reduced current through the thermistor, current is shunted away from the thermistor, and the increased voltage level is effective to trigger the voltage responsive means 16, rendering it conductive. This switching action may be further utilized for activating a warning device, such as an indicator light, alarm buzzer, etc., or, alternatively, may be utilized for operating a circuit breaker or the like in order to disrupt the power being supplied to the equipment, which is exposed to insufficient cooling. In addition, since current is shunted away from the thermistor as its temperature increases, the inherent fail-safe operation of the device may be noted, whereby burn-out of the thermistor is prevented because increased temperature results in decreased current flow through the thermistor.

Referring now to FIG. 4 one preferred embodiment of a device in accordance with the principles of the present invention is illustrated. As shown, the thermistor sensor 10 is coupled to a source of power (not shown) through the series calibration resistor 12, and defines a voltage divider therewith, having a junction 14. The junction 14 is coupled to a gate electrode 26 of a silicon controlled rectifier 28 through a suitable coupling means 30, such as a current limiting resistor. In addition, a transient suppression device, such as a capacitor 32, is coupled between the gate electrode 26 and ground in order to prevent inadvertent triggering of the silicon controlled rectifier as a result of transient electrical signals. Preferably, a suitable current sensing means 33 is coupled to the anode cathode circuit of the silicon controlled rectifier 28 and is adapted to be energized in response to conduction of the silicon controlled rectifier. The means 33 may comprise a suitable indicator device such as, an indicator light, an alarm buzzer, or the like, which is rendered operative in response to conduction of the silicon controlled rectifier 28, in order to provide an indication that the stability of the thermistor has been disturbed and that insufficient cooling is being provided. Alternatively, the means 33 may comprise a relay coil, for example, which is operatively coupled to a pair of relay contacts coupled to a load circuit, which may be connected to the equipment being cooled, so that energization of the relay coil may effect opening of normally closed relay contacts, thereby effecting turn-off of the equipment in response to a decreased heat transfer condition of the medium.

Referring to FIG. 5 another embodiment of the present invention is illustrated. In this embodiment the thermistor 10 is similarly coupled to a source of power (not shown) through a series resistor 12 and defines a voltage divider configuration therewith, including the junction 14. In operation, as previously explained, as the heat transfer characteristics of the medium in which the thermistor sensor is disposed decreases and the resistance and temperature of the thermistor increase, the voltage at the junction 14 increases to a preselected level, for example, the voltage level $V_o$ (referring to FIG. 2), while the current through the thermistor decreases to the level, $I_o$, as the anomaly point is approached. In the illustrated embodiment the junction 14 is coupled to a voltage responsive device 34, preferably comprising a voltage regulator diode, having a threshold voltage, which is substantially equal to or slightly less than preselected voltage level $V_o$. As illustrated, the voltage regulator diode 34 is reverse biased by the positive voltage at the junction 14, and may be rendered conductive in response to the establishment of the preselected voltage level at the junction 14. A suitable current limiting resistor 36 is also provided for connecting the cathode of the voltage regulator diode to the voltage divider junction 14, while the anode of the voltage regulator diode connected to the base electrode 38 of a switching transistor 40. The switching transistor is rendered conductive in response to energization of the voltage regulator diode 34 and in the illustrated embodiment is connected to a selectively energizable relay coil 42 operatively connected to a pair of normally closed relay contacts 44, which are adapted to selectively energize or de-energize an external load circuit in response to energization of the relay coil.

In this regard, it may be noted that the use of the terms energization or de-energization in referring to effecting operation or temporary disruption of an external load circuit are used interchangeably herein to denote an effect on the operation of the electrical circuit supplying power to the equipment being cooled. For example, in certain instances the relay contacts may be coupled to a circuit breaker which is rendered operative to de-activate an external load circuit in response to closing of normally open relay contacts. Similarly, the relay contacts may be maintained normally closed, as illustrated in FIG. 5, and coupled directly to an external load circuit in a manner so that opening of the relay contacts de-activates or interrupts the load circuit, when insufficient cooling occurs.

Referring to FIG. 6 an alternative embodiment of the present invention is illustrated including a signal light indicator, which is normally on during operation of the circuit, to indicate that the requisite cooling level is being sensed by the thermistor sensor, thereby indicating that the equipment is being exposed to sufficient cooling. In addition, when the thermistor sensor detects a decrease in the heat exchange properties of the fluid medium in which it is disposed, power is shunted away from the indicator, and another indicator such as a light of a different color or an alarm buzzer is energized to indicate the presence of insufficient cooling. Alternatively, if desired, a suitable relay coil and associated relay contacts may be provided coupled to an external load circuit for effecting a circuit breaking function in response to the presence of insufficient cooling.

More particularly, referring in detail to FIG. 6 the thermistor sensor 10 is connected to a power supply (not shown) through the series resistor 12 to form the voltage divider configuration, including the junction 14. In addition, a first switch means 46 preferably comprising a transistor is coupled to the power supply through a current limiting resistor 48, as shown. A suitable indicator 50, such as an indicating light, is provided connected between the power supply and the first switch transistor 46, arranged such that the indicator light 50 is energized or lit, while the switch transistor 46 is in a conductive state due to the application of a signal to its base electrode through the resistor 48. A second switching means 52, preferably comprising a second switch transistor, which is normally nonconductive is coupled to the voltage divider junction 14 through a voltage responsive means 54, such as a voltage regulator diode. The voltage regulator diode 54 has predetermined threshold voltage, which is in excess of the usual operating voltage developed at the junction 14, when the thermistor sensor 10 is being sufficiently cooled. In this connection, the voltage regulator diode preferably has a threshold voltage substantially equal to or somewhat less than the voltage level $V_o$ (referring to FIG. 2), i.e., the voltage level developed at the junction 14, when the thermistor sensor is not sufficiently cooled and changes to a high resistance condition.

The transistor 52 is also coupled to another indicating means 56, which is adapted to be energized in response to conduction of the transistor 52. In this regard, the transistor 52 is normally non-conductive, as previously mentioned, until the threshold voltage of the voltage regulator diode is reached which renders the transistor 52 conductive, causing electrical power to be shunted away from the base of transistor 46. Thus, when the transistor 52 is rendered conductive and electrical power is removed from the base of transistor 46, rendering transistor 46 non-conductive, energizing power is also removed from indicator light 50. Similarly, when transistor 52 is rendered conductive, it energizes the indicator 56. In those instances, where the indicator 56 comprises an indicator light, such indicator light is preferably of a different color from the indicator light 50, so as to provide a visual indication that the thermistor sensor 10 is no longer being exposed to proper coolant flow. Alternatively, indicator 56 may comprise an alarm buzzer, or the like, to provide an audio indication of reduced heat transfer characteristics. If desired, the indicating means 56 may also include a suitable relay coupled to an external circuit breaker, as previously explained, so as to provide an indication of improper operation, as well as de-energizing the external load circuit.

Figure 7:
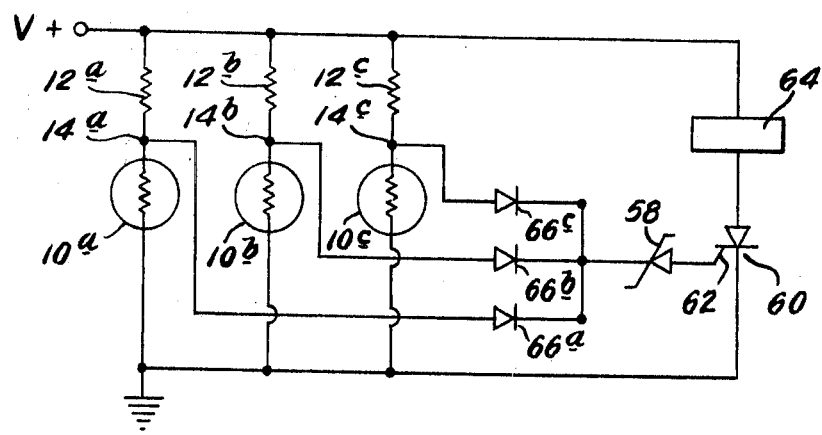

Referring to FIG. 7, another alternative embodiment of a device in accordance with the principles of the present invention is illustrated. The illustrated embodiment is particularly adapted for effecting multi-point sensing of the heat exchange properties of a fluid medium. As illustrated, a plurality of thermistor sensors, designated by the numerals 10a, 10b, and 10c, are provided. These thermistor sensors are preferably arranged in mutually spaced relationship with respect to each other in the fluid medium. For example, the thermistor sensors may be disposed in different locations for sensing the air flow being supplied to different regions of the equipment which is being cooled and for energizing a suitable alarm, circuit breaker, etc., when the coolant flow at any of these locations is reduced or disrupted.

More particularly, referring in detail to the embodiment, illustrated in FIG. 7, each of the thermistor sensors 10a, - 10c is coupled to a power supply (not shown) through an associated series resistor 12a, 12b, and 12c respectively to define a voltage divider configuration. In addition, each of the respective voltage divider arrangements includes a junction 14 a, 14 b, and 14 c. The respective junctions 14 a - 14 c are electrically connected in parallel relationship to a voltage responsive means 58 preferably comprising a voltage regulator diode, having a preselected threshold voltage, so that a rise in the resistance of any of the thermistor sensors 10 a - 10 c and an associated rise in the voltage at one of the respective junctions 14 a - 14 c in excess of the threshold voltage is effective to energize the voltage regulator diode. In this connection the voltage regulator diode 58 is also coupled to a suitable switch means 60 preferably comprising a silicon controlled rectifier, having a gate electrode 62 connected to the voltage regulator diode, so that triggering of the silicon controlled rectifier 60 results in response to energization of the voltage regulator diode 58. Accordingly, when the threshold voltage of the voltage regulator diode 58 is exceeded, a signal is applied to the gate electrode 62 of silicon controlled rectifier 60, to trigger the silicon controlled rectifier into conduction.

In addition, a suitable indicating means 64 is preferably provided in the anode-cathode circuit of the silicon controlled rectifier 60, and is adapted to be energized in response to triggering of the silicon controlled rectifier. The indicating means 64 may comprise a suitable indicator light, an alarm buzzer, etc., for providing an indication that insufficient cooling is sensed by one of the thermistor sensors 10 a - 10 c. If desired, the indicating means 64 may include a suitable relay coil coupled to an associated pair of relay contacts in an external load circuit, arranged such that energization of the relay coil effects a circuit breaking function, when one or more of the associated thermistor sensors 10 a - 10 c senses the presence of insufficient coolant flow.

As an additional feature, in the embodiment illustrated in FIG. 7, the voltage regulator diode 58 is arranged to have a preselected threshold, voltage level, which is sufficient to prevent undesired triggering of the silicon controlled rectifier during usual operation. In this regard, a relatively small electrical signal may be applied to the voltage regulator diode 58 from each of the associated junctions 14 a - 14 c, even in the presence of the requisite coolant flow, and in certain instances the summation of these signals may approach the gating level of the silicon controlled rectifier. Accordingly, the voltage regulator diode 58 is selected such that its threshold voltage is in excess of the summation of such signals in order to prevent inadvertent triggering of the silicon controlled rectifier during usual operation of the system, until one or more of the thermistor sensors is insufficiently cooled such that its resistance increases substantially and a voltage level is established at one of the junctions 14 a - 14 c, approaching the voltage $V_0$ (referring to FIG. 2).

It is also generally desirable to provide isolation means 66 a, 66 b, and 66 c between each of the respective junctions 14 a - 14 c and the voltage regulator diode 58. The isolation means 66 a - 66 c preferably comprises a plurality of steering diodes, with one of such steering diodes being connected between each of the respective junctions 14 a - 14 c and the voltage regulator diode. In operation, the steering diodes function to assure the maintenance of electrical isolation between the respective thermistor sensors, when a particular thermistor sensor is subjected to decreased cooling signal is energized sufficiently to effect establishment of a voltage level in excess of the voltage regulator diode threshold voltage at its associated thermistor-resistor junction, thereby preventing sympathetic operation of the other thermistor sensors. Thus, it may be seen that operation of the embodiment illustrated in FIG. 7 is substantially similar to that of the previously described embodiments. When any one or more of the thermistor sensors 10 a - 10 c is exposed to a decreased heat transfer condition of the fluid medium, the resistance of the particular thermistor sensor increases as previously explained, which results in the establishment of a substantially increased voltage level at its associated thermistor-resistor junction effecting energization of the voltage regulator diode 58 and consequent triggering of the silicon controlled rectifier 60, which in turn operates the indicating means 64.

Figure 8:
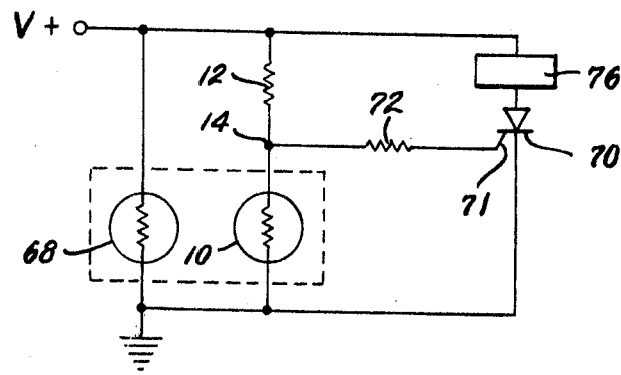

Referring to FIG. 8 an alternative embodiment of the present invention is illustrated which includes a thermistor sensor arranged substantially independent of minor changes in ambient temperature, while maintaining its sensitivity to variations in the heat exchange properties of a fluid medium, such as represented by variations in the flow rate. More particularly, the thermistor sensor 10 is coupled to a power supply (not shown) through the serially connected resistor 12, to form the voltage divider configuration having the junction 14, as previously explained. However, the thermistor sensor 10 in the illustrated embodiment is selected to have a relatively high anomaly point temperature, and in one example, has an anomaly point temperature of approximately 120°C. In addition, a second thermistor sensor 68 is provided in thermal communication with the thermistor sensor 10 and functions as a heater. In this connection, the thermistor 68 is directly coupled to the power supply so that it may be readily heated to a level in excess of its anomaly temperature. In addition, the thermistor sensor 68 is selected to have a relatively low anomaly temperature, in comparison with the thermistor sensor 10, and in one example has an anomaly temperature of approximately 80°C in comparison with the 120°C anomaly temperature of thermistor sensor 10. As a result, thermistor sensor 68 is energized to the point where self-heating occurs substantially in advance of this occurance with respect to thermistor sensor 10. Consequently, during usual operation of the device when proper coolant flow is present the thermistor sensor 68, nevertheless, remains in its self-heating region, and transfers a sufficient amount of heat to thermistor sensor 10 so as to maintain thermistor sensor 10 at a relatively high temperature, although below its anomaly point temperature. Consequently, minor changes in ambient temperature do not affect the operation of thermistor sensor 10, since it is maintained at a relatively high temperature, although it retains its sensitivity to variations in the heat exchange properties of the fluid medium to which it is exposed.

Accordingly, operation of the FIG. 8 embodiment is generally similar to that of the preceding embodiments. More particularly, when the thermistor sensor 10 ie exposed to a fluid medium having decreased heat exchange properties it senses that change and begins to self-heat and develop a substantially increased resistance as its anomaly point is approached, as previously explained. When the voltage level at junction 14 reaches the level $V_0$ (referring to FIG. 2), the signal is sufficient to activate a suitable switch means 70, such as a silicon controlled rectifier, which includes a gate electrode 71 coupled to the junction through a current limiting resistor 72. In addition, a suitable indicating means 76 is preferably provided connected in the anode-cathode circuit of the silicon controlled rectifier and is activated when the silicon controlled rectifier is triggered. In this regard the indicating means may, for example, comprise a suitable indicator light, an alarm buzzer, or the like. Similarly, the indicating means 76 may include a relay coil, for example, which upon energization, effects opening or closing of an associated pair of relay contacts in an external load circuit so as to effect a circuit breaking function, when the coolant flow rate decreases to a possibly deleterious level.

It may be noted that a system such as that illustrated hereinabove in accordance with the principles of the present invention is quite flexible and versatile in use and may be utilized in various configurations. For example, the thermistor sensor may be disposed in a suitable gaseous medium, such as air, for sensing a decrease in the flow rate utilized for cooling heat sensitive equipment, since a reduced flow velocity effects less efficient heat transfer, which in turn disturbs the stability of the thermistor sensor, as previously explained, and causes an abrupt rise in the resistance of the thermistor sensor as it is heated. Similarly, the thermistor sensor may be utilized for merely sensing a change in the ambient temperature of the air as an indication that the equipment is not being properly cooled. Alternatively, the thermistor sensor may be adapted for disposition in a liquid medium. In such circumstances the thermistor sensor may be utilized, for example, for sensing a liquid flow rate in the same general manner as it is utilized for sensing a gaseous flow, or, for detecting the level of liquid in a container. In the latter situation the characteristics of the thermistor sensor may be selected such that in the presence of the liquid at a preselected temperature, the thermistor sensor is sufficiently cooled, while in thermal communication with the liquid, whereas self heating and consequent disturbance of the stability of the thermistor sensor occurs, in the manner previously explained, when the thermistor sensor is not in thermal communication with the liquid.

It may be further noted that in the various embodiments previously described a transistor and a silicon controlled rectifier have been indicated as suitable for sensing increased thermistor resistance incident to a substantial increase in the self-heating of the thermistor, although various other devices may be used in this connection, such as a triac, a thyristor, etc. In addition, it should be noted that in those instances, where a transistor resistance sensing switch is utilized, a non-latching circuit function is obtained, i.e., when the turn-on signal is removed from its base electrode the transistor becomes non-conductive. Similarly, in those instances, where a silicon controlled rectifier resistance sensing switch is utilized, a latching circuit function results, i.e., once triggered, the silicon controlled rectifier remains conductive until the bias potential is removed from its anode-cathode circuit. Accordingly, it may be appreciated that the selection of the resistance sensing switch element to be utilized is dependent upon the contemplated circuit function and the indication or reaction which is desired.

Thus, a novel apparatus has been provided for use in detecting variations in the heat exchange properties of a fluid medium.

Although several preferred embodiments of the present invention have been described in detail it should be understood that various modifications and changes will be readily apparent to those skilled in the art and such changes and modifications are deemed to be within the spirit and scope of the invention as set forth in the appended claims.

What is claimed is:

1. A device for sensing variations in the heat exchange properties of a fluid medium as an indication of the relative velocity of the medium comprising
a thermistor sensor adapted to be disposed in thermal communication with the medium, said thermistor sensor having a resistance which varies in response to variations in the heat exchange properties associated with variations in the relative velocity of the medium and being adapted to operate in a self-heating mode, calibration means coupled to said thermistor sensor and defining a junction therewith, energizing means coupled to said thermistor sensor to effect the application of sufficient electrical power to said thermistor sensor to enable operation thereof in its self-heating mode so as to establish a first preselected voltage level at said junction in response to a first relative velocity of the medium and to establish a second preselected voltage level at said junction in response to a second relative velocity of the medium less than said first relative velocity, said second preselected voltage level being associated with operation of said thermistor sensor in its self-heating mode, voltage responsive means comprising a voltage regulator diode having a threshold voltage substantially equal to said second preselected voltage level coupled to said junction for providing an electrical signal only in response to the establishment of said second preselected voltage level at said junction, and a selectively energizable switch means coupled to said voltage regulator diode and only operable in response to the generation of said electrical signal for selectively energizing a load.

2. A device in accordance with claim 1 wherein a plurality of thermistor sensors are provided each being adapted to operate in its self-heating mode and having a resistance which increases with increasing temperature, said thermistor sensors being arranged in mutually spaced relationship with respect to each other at different locations within the fluid medium for sensing variations in the heat exchange properties associated with variations in the relative velocity of the medium at said different locations.

3. A device in accordance with claim 2 wherein a plurality of steering diodes are provided, each of said steering diodes respectively connecting each one of said thermistor sensors to said voltage regulator diode for providing selective electrical isolation between said respective thermistor sensors and said voltage regulator diode.

4. A device in accordance with claim 1 wherein said thermistor sensor has a resistance which increases with increasing temperature and said calibration means comprises a resistor connected in series relationship with said thermistor sensor to define said junction.

5. A device in accordance with claim 4 wherein said switch means comprises a silicon controlled rectifier having its gate electrode coupled to said voltage regulator diode, said silicon controlled rectifier being adapted to be rendered conductive by said voltage regulator diode.

6. A device in accordance with claim 5 wherein an indicating means is provided coupled to said silicon controlled rectifier, said indicating means being rendered operable in response to conduction of said silicon controlled rectifier so as to provide an indication of a variation in the relative velocity of the medium.

7. A device in accordance with claim 6 wherein means are provided electrically coupled to said energizing means and thermally coupled to said thermistor sensor for heating said thermistor sensor to a preselected temperature below its anomaly point so as to substantially desensitize said thermistor sensor from relatively minor changes in ambient temperature.

8. A device in accordance with claim 7 wherein said means for heating said thermistor sensor comprises another thermistor sensor adapted to operate in its self-heating mode and having an anomaly point substantially below that of said thermistor sensor.

9. A device in accordance with claim 4 wherein said switch means comprises a selectively energizable relay coil coupled to said silicon controlled rectifier and an associated pair of relay contacts operatively connected to said relay coil, said relay contacts being adapted to selectively energize a load in response to energization of said relay coil.

10. A device for sensing and indicating variations in the heat exchange properties of a fluid medium comprising a thermistor sensor adapted to be disposed in thermal communication with the medium, said thermistor sensor having a resistance which increases with increasing temperature and being adapted to operate in a self-heating mode, a resistor coupled to said thermistor sensor to define a voltage divider including a junction between the resistor and the thermistor sensor, energizing means coupled to said thermistor sensor through said resistor to effect the application of sufficient electrical power to said thermistor sensor to enable operation thereof in its self-heating mode so as to establish a first preselected voltage level at said junction in response to a first condition of the heat exchange properties of the medium and to establish a second preselected voltage level at said junction associated with operation of said thermistor in its self-heating mode in response to a second condition of the heat exchange properties of the medium, said second condition representing a decrease in the heat exchange properties of the medium relative to the first condition, first switch means including a first transistor coupled to said voltage divider, said first transistor being rendered conductive in response to said first preselected voltage level and being rendered non-conductive in response to said second preselected voltage level, indicating means coupled to said first transistor, said indicating means being energized in response to conduction of said first transistor, voltage responsive means coupled to said junction for providing an electrical signal in response to the establishment of said second preselected voltage level at said junction, second switch means including a second transistor coupled to said voltage responsive means, said second transistor being rendered conductive in response to said electrical signal and shunting said first transistor so as to render said first transistor non-conductive, and selectively operable means coupled to said second transistor for providing an indication in response to conduction of said second transistor.

* * * * *